(12) United States Patent
Stefani

(10) Patent No.: US 9,134,444 B2
(45) Date of Patent: Sep. 15, 2015

(54) SYSTEM AND METHOD FOR DEDUCING CAVERN PROPERTIES

(71) Applicant: Joseph Paul Stefani, San Francisco, CA (US)

(72) Inventor: Joseph Paul Stefani, San Francisco, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 541 days.

(21) Appl. No.: 13/686,418

(22) Filed: Nov. 27, 2012

(65) Prior Publication Data

US 2014/0149045 A1  May 29, 2014

(51) Int. Cl.
G06F 11/00 (2006.01)
G01V 1/30 (2006.01)
G01V 1/28 (2006.01)

(52) U.S. Cl.
CPC . *G01V 1/30* (2013.01); *G01V 1/282* (2013.01)

(58) Field of Classification Search
CPC .............. E02D 1/00; B65G 5/00; E21B 33/13
USPC ............................... 702/14, 13, 182–185, 188
See application file for complete search history.

(56) References Cited

U.S. PATENT DOCUMENTS

| 5,671,136 A | 9/1997 | Willhoit |
| 5,892,732 A * | 4/1999 | Gersztenkorn ................ 367/72 |
| 8,395,967 B2 * | 3/2013 | Lou et al. ........................ 367/51 |
| 2010/0198638 A1 | 8/2010 | Deffenbaugh et al. |

FOREIGN PATENT DOCUMENTS

| FR | 1297213 A | 6/1962 |
| WO | 2012/107791 A1 | 8/2012 |

OTHER PUBLICATIONS

Chen Maoshan, Zhan Shifan, Wan Zhonghong, Zhang Hongying and Li Lei, Detecting carbonate-karst reservoirs using the directional amplitude gradient difference Technique, 2011 SEG SEG San Antonio 2011 Annual Meeting.

* cited by examiner

*Primary Examiner* — Edward Raymond
(74) *Attorney, Agent, or Firm* — Marie L. Clapp

(57) ABSTRACT

Strength parameters of the contents of subsurface caverns are deduced through seismic information. Known properties of formations surrounding the caverns, and ratios of seismic amplitudes between the caverns and the surrounding formations are leveraged to deduce the strength parameters within the caverns.

21 Claims, 4 Drawing Sheets

Image shape is independent of cavern shape, for cavern size <0.1 wavelength.

Test shapes included:

Small and large sphere 3 intersecting spars 3 intersecting disks

Long vertical spar 500 m across
Model Seismic Anomaly
All same scale
250 m

Image shape is independent of cavern shape, for cavern size <0.1 wavelength.

Test shapes included:

Small and large sphere 3 intersecting spars 3 intersecting disks

Long vertical spar

SYSTEM AND METHOD FOR DEDUCING CAVERN PROPERTIES

FIELD

The disclosure relates to deducing properties of a cavern within a subsurface volume of interest from seismic information for the subsurface volume of interest.

BACKGROUND

Anomalous high amplitude diffractors are sometimes imaged in formations such as carbonate rocks. Such diffractors can include buried "megaporosity", or small caverns, existing at depth (e.g., within karst layers). Conventional techniques for inferring the type of material filling these caverns (e.g., loose sediment, breccia, brine, hydrocarbons, and/or other material) rely solely on the seismic amplitude of the diffraction patterns generated by such caverns. These techniques do not provide a quantitative technique for estimating properties, such as elastic properties, of the fill material.

SUMMARY

One aspect of the disclosure relates to a computer-implemented method of deducing properties of subsurface caverns through seismic information. The method comprises obtaining seismic information derived from seismic data captured at or near a subsurface volume of interest that includes a cavern, wherein the cavern is represented in the seismic information as a point diffractor; determining from the seismic information a relationship of a cavern amplitude of the cavern in the seismic information to a background amplitude of the subsurface volume of interest at one or more locations that correspond to the position of the cavern; obtaining parameter values of parameters of the subsurface volume of interest at one or more locations that correspond to the position of the cavern; obtaining proposed property values of properties of the cavern that impact seismic measurements; obtaining a volume model of the subsurface volume of interest in which the subsurface volume of interest has the obtained parameter values around the cavity, and in which the cavern has the proposed property values; performing synthetic seismic analysis on the volume model to obtain synthetic seismic information; and analyzing the proposed property values by comparing a relationship of a model cavern amplitude of the cavern in the synthetic seismic information to a model background amplitude of the subsurface volume of interest with the relationship of the cavern amplitude to the background amplitude.

Another aspect of the disclosure relates to a system configured to deduce properties of subsurface caverns through seismic information. The system comprises one or more processors configured to execute computer program modules. The computer program modules comprise a data module, a relationship module, a proposed value module, a model module, a synthetic seismic module, and an analysis module. The data module is configured (i) to obtain seismic information derived from seismic data captured at or near a subsurface volume of interest that includes a cavern, wherein the cavern is represented in the seismic information as a point diffractor, and (ii) to obtain parameter values of parameters of the subsurface volume of interest at one or more locations that correspond to the position of the cavern. The relationship module is configured to determine from the seismic information a relationship of a cavern amplitude of the cavern in the seismic information to a background amplitude of the subsurface volume of interest at one or more locations that correspond to the position of the cavern. The proposed value module is configured to obtain proposed property values of properties of the cavern that impact seismic measurements. The model module is configured to obtain a volume model of the subsurface volume of interest in which the subsurface volume of interest has the obtained parameter values around the cavity, and in which the cavern has the proposed property values. The synthetic seismic module is configured to perform synthetic seismic analysis on the volume model to obtain synthetic seismic information. The analysis module is configured to analyze the proposed property values by comparing a relationship of a model cavern amplitude of the cavern in the synthetic seismic information to a model background amplitude of the subsurface volume of interest with the relationship of the cavern amplitude to the background amplitude.

Yet another aspect of this disclosure relates to non-transient electronic storage media that stores computer executable instructions configured to cause one or more processors to perform a method of deducing properties of subsurface caverns through seismic information. The method comprises obtaining seismic information derived from seismic data captured at or near a subsurface volume of interest that includes a cavern, wherein the cavern is represented in the seismic information as a point diffractor; determining from the seismic information a relationship of a cavern amplitude of the cavern in the seismic information to a background amplitude of the subsurface volume of interest at one or more locations that correspond to the position of the cavern; obtaining parameter values of parameters of the subsurface volume of interest at one or more locations that correspond to the position of the cavern; obtaining proposed property values of properties of the cavern that impact seismic measurements; obtaining a volume model of the subsurface volume of interest in which the subsurface volume of interest has the obtained parameter values around the cavity, and in which the cavern has the proposed property values; performing synthetic seismic analysis on the volume model to obtain synthetic seismic information; and analyzing the proposed property values by comparing a relationship of a model cavern amplitude of the cavern in the synthetic seismic information to a model background amplitude of the subsurface volume of interest with the relationship of the cavern amplitude to the background amplitude.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
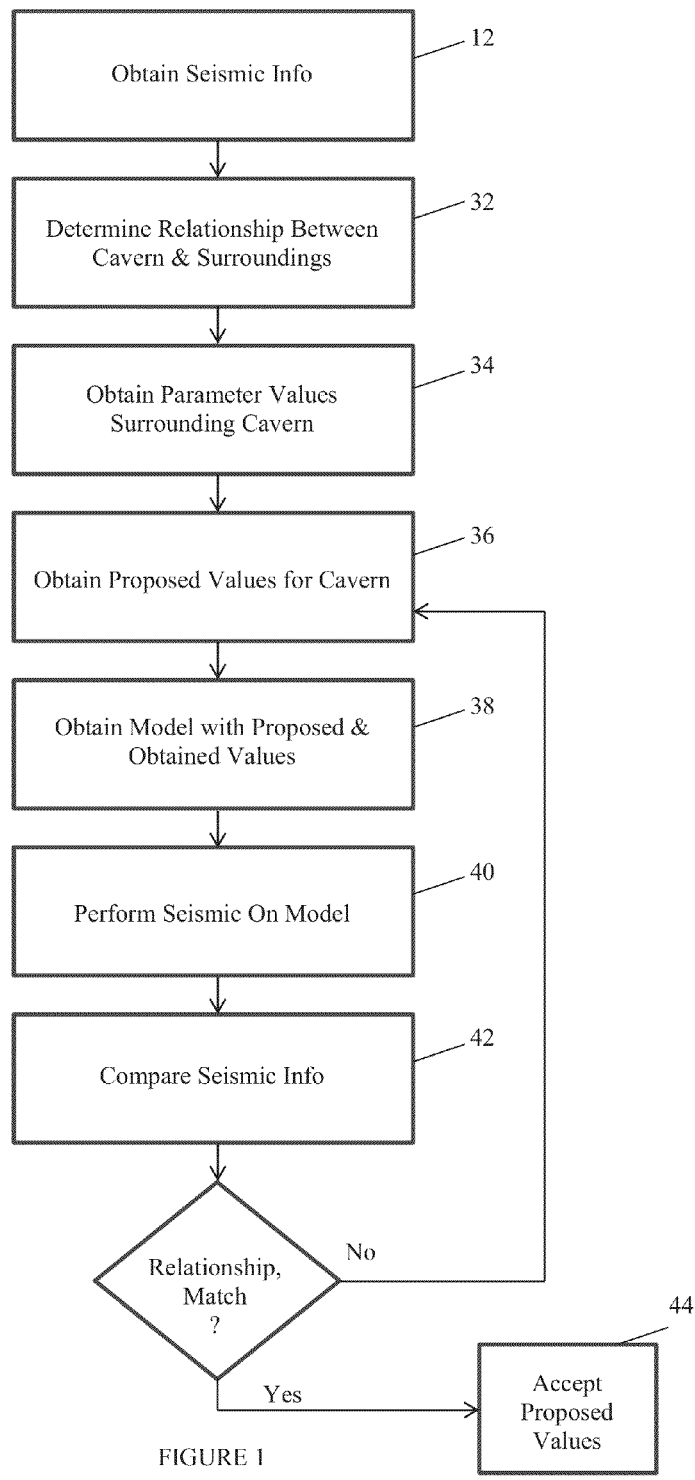
FIG. 1 illustrates a method of deducing properties of subsurface caverns through seismic information.

FIG. 1 illustrates a method 10 of deducing properties, such as strength parameters of the contents and/or other properties, of subsurface caverns through seismic information. Method 10 may leverage known property values of properties of formations surrounding the caverns, and ratios of seismic amplitudes between the caverns and the surrounding formations to deduce the strength parameters within the caverns.

At an operation 12, seismic information is obtained. The seismic information may include one or more of a seismic image volume, an earth model, a velocity model, and/or other information. The seismic information has been derived from seismic data captured at or near a subsurface volume of interest that includes a cavern. The cavern is represented in the seismic information as a point diffractor. This is because caverns tend to have dimensions on the order of 0.1 times of the wavelength of the seismic waves used during acquisition of the seismic data. The seismic information may include and/or be derived from seismic data captured during one or more seismic acquisitions in which the seismic data was captured in accordance with one or more acquisition parameters. The one or more acquisition parameters may include one or more of a source location, a source spacing, a source wavelength, a receiver location, a receiver spacing, and/or other acquisition parameters.

Figure 2:
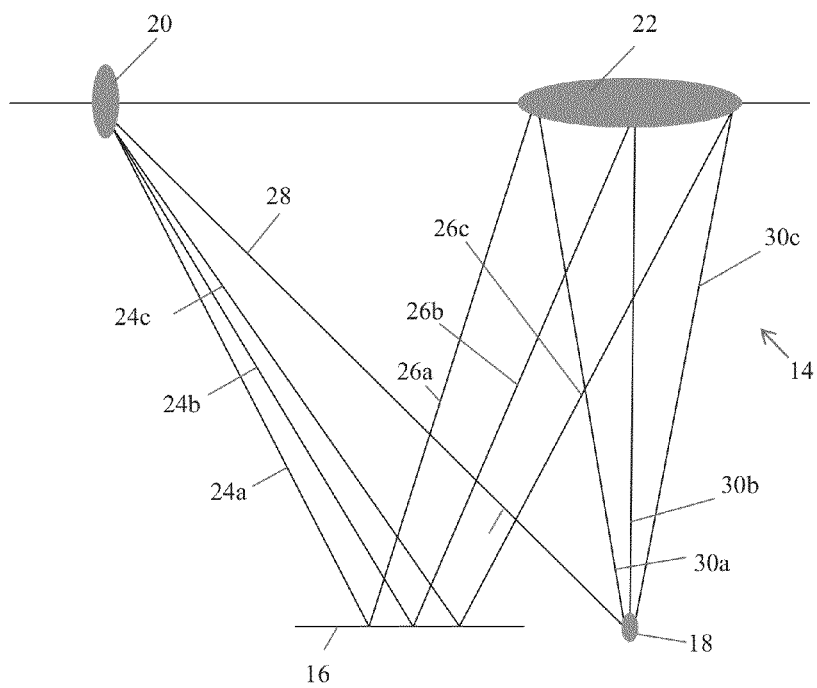
FIG. 2 illustrates seismic diffraction caused by a cavern in a subsurface volume.

By way of illustration, FIG. 2 provides a two-dimensional representation of a subsurface volume of interest 14 that includes a reflector 16 (e.g., such as a horizon or other reflector), a cavern 18, and/or other features. During a seismic acquisition, seismic waves emanate from a source 20 and are measured by receivers disposed in a receiver patch 22. Source traces 24 (shown as 24a, 24b, and 24c) depict seismic energy that emanates from source 20 to reflector 16. Corresponding receiver traces 26 (shown as 26a, 26b, and 26c) are reflections of source traces 24, with receiver traces 26 traveling from reflector 16 to receiver patch 24. By contrast, an individual source trace 28 emanating from source 20 that impinges on cavern 18 is diffracted by cavern 18 into a plurality of receiver traces 30 (shown as 30a, 30b, and 30c) that travel to receiver patch 22. Reflection of source traces 24 by reflector 16 into receiver traces 26, and subsequent detection of receiver traces 26 at receiver patch 22 facilitates determination of various information related to reflector 16. Such information includes shape information, composition information, and/or other information. On the other hand, diffraction of source trace 28 into receiver traces 30, and subsequent detection of receiver traces 30 at receiver patch 22 may not facilitate accurate and/or precise determination of corresponding information for cavern 18.

Figure 3:
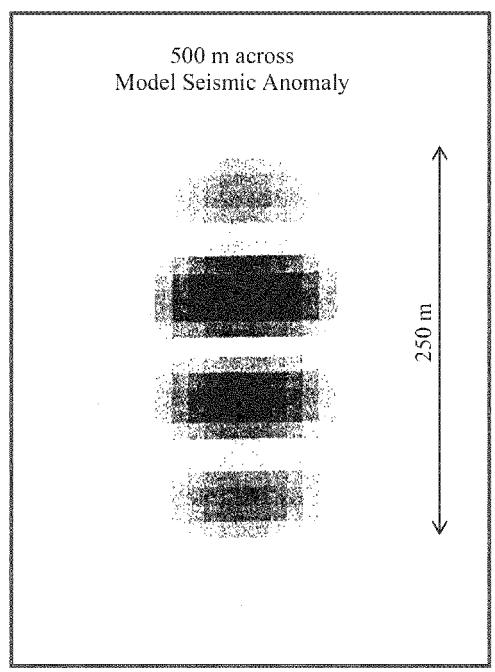
FIG. 3 illustrates a diffraction pattern caused by a cavern in a subsurface volume.

For example, FIG. 3 shows a seismic image of a point diffractor (e.g., a cavern) having a size that is less than 0.1 of a seismic wavelength used to acquire the seismic image. As can be seen in FIG. 3, the resulting image is essentially just a diffraction pattern. FIG. 3 further shows a plurality of different shapes implemented as shapes for the point diffractor in separate seismic analysis, all of which produced essentially the same seismic image (e.g., that shown in FIG. 3).

Returning to FIG. 1, at an operation 32, a relationship between seismic amplitude of the cavern and a background seismic amplitude in the obtained seismic information is determined. The background seismic amplitude is the seismic amplitude present in the seismic information at locations surrounding the cavern. The background seismic amplitude may be an aggregation of amplitudes surrounding the cavern (e.g., an average of reflector amplitudes, a weighted average of reflector amplitudes, etc.), a specific amplitude or set of amplitudes (e.g., an amplitude of a closest reflector, etc.), and/or other amplitudes from the obtained seismic information. The relationship determined at operation 32 may include a ratio (e.g., cavern amplitude to background amplitude, and/or other ratios), and/or other relationships.

At an operation 34, property values for properties of the subsurface volume of interest are obtained. These property values are for locations in the subsurface volume of interest that correspond to the position of the cavern. A location that corresponds to the position of the cavern may be of a similar depth, be situated in a common formation with the cavern, been deposited at a common geological time with the formation(s) surrounding the cavern, having a seismic amplitude that is the same as or within some tolerance of the background amplitude, and/or correspond to the position of the cavern in other ways. The property values may be obtained from well logs, core measurements, and/or other techniques for obtaining property values for subsurface formations. Obtaining the property values may include determining property values, accessing stored property values, receiving property values over a network, receiving property values through a user interface, and/or obtaining property values in other ways. The properties for which property values are obtained may include one or more of porosity, density, bulk modulus, rigidity, and/or other properties.

At an operation 36, proposed property values for the cavern are obtained. The proposed property values are for properties that impact or may impact the seismic amplitude of the diffraction pattern caused by the cavern in the obtained seismic information. Such properties may include, for example, one or more strength parameters (e.g., density, bulk modulus, rigidity, etc.), porosity, volume, a size dimension, and/or other properties. The obtained property values may include property values determined based on observed data. For example, a volume of the cavern may be determined based on one or more of volumes of other caverns present in or near the subsurface volume of interest, volumes of other caverns in formation(s) similar to the formation(s) in which the cavern is located, and/or determined from other information related to the volume of other caverns. The obtained proposed property values may include a combination of two or more property values that correspond to a type of fill material within the cavern (e.g., liquid, gas, solid, etc.). Obtaining the proposed property values may include one or more of determining a proposed property value, receiving a proposed property value through a user interface, receiving a proposed property value over a network, accessing a stored proposed property value, and/or other techniques for obtaining a proposed property value.

At an operation 38, a volume model of the subsurface volume of interest is obtained. The volume model of the subsurface volume of interest may reflect one or more of the property values obtained at operations 34 and 36, reflectors interpreted and/or present in the seismic information obtained at operation 12, and/or other information. Obtaining the volume model may include one or more of generating the volume model, requesting generation of the volume model, receiving the generated volume model, and/or other operations.

At an operation 40, synthetic seismic analysis is performed on the volume model. The synthetic seismic may implement one or more of the acquisition parameters for the seismic information obtained at operation 12. As such, the synthetic seismic information generated by the synthetic seismic analysis may correspond to the seismic information obtained at operation 12. Performance of the synthetic seismic analysis may include generating synthetic seismic acquisition data, determining or deriving further seismic information from the generated synthetic seismic acquisition data, and/or performance of other analysis. The performance of the synthetic seismic analysis may include generating a seismic image of the subsurface volume of interest from the synthetic seismic data. In this seismic image, the cavern is again represented by a diffraction pattern similar to the corresponding diffraction in the seismic information obtained at operation 12.

At an operation 42, the proposed property values obtained at operation 36 are analyzed by a comparison between the synthetic seismic information generated at operation 40 and the seismic information obtained at operation 12. This comparison includes determining a relationship between the amplitude of the cavern in the synthetic seismic information and background amplitude in the synthetic seismic information (e.g., a ratio between the cavern amplitude and the background amplitude, and/or other relationships), and then comparing this relationship with the relationship determined at operation 32. Responsive to the relationship of the cavern amplitude with the background amplitude in the synthetic seismic information corresponding to the relationship determined at operation 32, a determination is made that the proposed property values obtained at operation 36 may be accurate at an operation 44. Responsive to the relationship of the cavern amplitude with the background amplitude in the synthetic seismic information not corresponding to the relationship determined at operation 32, method 10 may loop back to operation 36 and a new set of proposed property values may be obtained.

It will be appreciated that the determinations of relationships between cavern amplitude and background amplitude in the obtained seismic information and the synthetic seismic information provides a normalization of the cavern amplitude that facilitates comparison between the obtained seismic information and the synthetic seismic information. The loop back to operation 36 facilitates tuning of the proposed property values of the cavern until a suitable correspondence with the property values of the cavern in the obtained seismic information is obtained.

The operations of method 10 presented herein are intended to be illustrative. In some embodiments, method 10 may be accomplished with one or more additional operations not described, and/or without one or more of the operations discussed. Additionally, the order in which the operations of method 10 are illustrated in FIG. 1 and described herein is not intended to be limiting.

In some implementations, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

Figure 4:
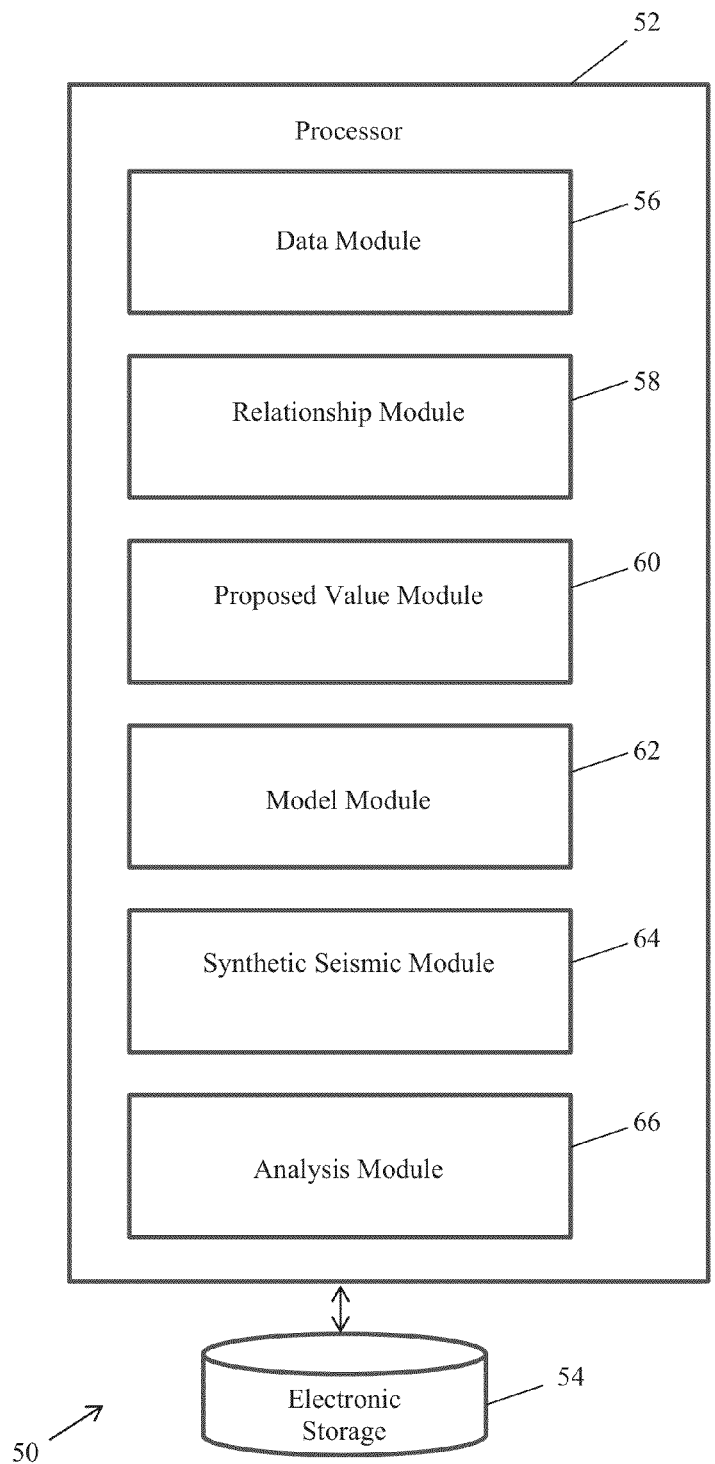
FIG. 4 illustrates a system configured to deduce strength parameters of the contents of subsurface caverns through seismic information.

FIG. 4 illustrates a system 50 configured to deduce strength parameters of the contents of subsurface caverns through seismic information. In some implementations, system 50 may be configured to perform some or all of the operations of method 10 shown in FIG. 1 and described herein. As can be seen in FIG. 4, system 50 may include one or more of at least one processor 52, electronic storage 54, and/or other components.

Processor 52 is configured to execute one or more computer program modules. The computer program modules include one or more of a data module 56, a relationship module 58, a proposed value module 60, a model module 62, a synthetic seismic module 64, an analysis module 66, and/or other modules.

Data module 56 is configured to obtain information to be implemented subsequently in deducing strength parameters of the cavern. Such information may include seismic information for a subsurface volume of interest that includes the cavern, property values for properties of the subsurface volume of interest at one or more locations that correspond to the position of the cavern, and/or other information. In some implementations, data module 56 may perform some or all of the functions associated with one or both of operations 12 and/or 34 (shown in FIG. 1 and described herein).

Relationship module 58 is configured to determine from the seismic information a relationship of a cavern amplitude of the cavern in the obtained seismic information to a background amplitude of the subsurface volume of interest at one or more locations that correspond to the position of the cavern. In some implementations, relationship module 56 performs some or all of the functions associated with operation 32 of method 10 (shown in FIG. 1 and described herein).

Proposed value module 60 is configured to obtain proposed property values of the cavern that impact seismic measurements. In some implementations, proposed value module 60 is configured to perform some or all of the functions associated with operation 36 of method 10 (shown in FIG. 1 and described herein).

Model module 62 is configured to obtain a volume model of the subsurface volume of interest in which the subsurface volume of interest has the obtained property values around the cavern, and in which the cavern has the proposed property values. In some implementations, model module 62 is configured to perform some or all of the functions associated with operation 38 of method 10 (shown in FIG. 1 and described herein).

Synthetic seismic module 64 is configured to perform synthetic seismic analysis of on the volume module to obtain synthetic seismic information. In some implementations, synthetic seismic module 64 is configured to perform some or all of the functions associated with operation 40 of method 10 (shown in FIG. 1 and described herein).

Analysis module 66 is configured to analyze the proposed property values by comparing a relationship of a model cavern amplitude of the cavern in the synthetic seismic information with a model background amplitude of the subsurface volume of interest with the relationships of the cavern amplitude to the background amplitude. In some implementations, analysis module 66 is configured to perform some or all of the functions associated with operation 42 of method 10 (shown in FIG. 1 and described herein).

Processor 52 is configured to provide information processing capabilities in system 50. As such, processor 52 may include one or more of a digital processor, an analog processor, a digital circuit designed to process information, an analog circuit designed to process information, a state machine, and/or other mechanisms for electronically processing information. Although processor 52 is shown in FIG. 4 as a single entity, this is for illustrative purposes only. In some implementations, processor 52 may include a plurality of processing units. These processing units may be physically located within the same device, or processor 52 may represent processing functionality of a plurality of devices operating in coordination. Processor 52 may be configured to execute modules 56, 58, 60, 62, 64, and/or 66 by software; hardware; firmware; some combination of software, hardware, and/or firmware; and/or other mechanisms for configuring processing capabilities on processor 52.

It should be appreciated that although modules 56, 58, 60, 62, 64, and/or 66 are illustrated in FIG. 4 as being co-located within a single processing unit, in implementations in which processor 52 includes multiple processing units, one or more of modules 56, 58, 60, 62, 64, and/or 66 may be located remotely from the other modules. The description of the functionality provided by the different modules 56, 58, 60, 62, 64, and/or 66 described below is for illustrative purposes, and is not intended to be limiting, as any of modules 56, 58, 60, 62, 64, and/or 66 may provide more or less functionality than is described. For example, one or more of modules 56, 58, 60, 62, 64, and/or 66 may be eliminated, and some or all of its functionality may be provided by other ones of modules 56, 58, 60, 62, 64, and/or 66. As another example, processor 32 may be configured to execute one or more additional modules that may perform some or all of the functionality attributed below to one of modules 56, 58, 60, 62, 64, and/or 66.

Electronic storage 54 comprises non-transient electronic storage media that electronically stores information. The electronic storage media of electronic storage 54 may include one or both of system storage that is provided integrally (i.e., substantially non-removable) with system 50 and/or removable storage that is removably connectable to system 50 via, for example, a port (e.g., a USB port, a firewire port, etc.) or a drive (e.g., a disk drive, etc.). Electronic storage 54 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 54 may include virtual storage resources, such as storage resources provided via a cloud and/or a virtual private network. Electronic storage 54 may store software algorithms, information determined by processor 52, and/or other information that enables system 50 to function properly. Electronic storage 54 may be a separate component within system 50, or electronic storage 54 may be provided integrally with one or more other components of system 50 (e.g., processor 52).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of deducing properties of subsurface caverns through seismic information, the method being implemented in a computer system that includes one or more physical processors, the method comprising:

obtaining seismic information derived from seismic data captured at or near a subsurface volume of interest that includes a cavern, wherein the cavern is represented in the seismic information as a point diffractor;

determining from the seismic information a relationship of a cavern amplitude of the cavern in the seismic information to a background amplitude of the subsurface volume of interest at one or more locations that correspond to the position of the cavern;

obtaining parameter values of parameters of the subsurface volume of interest at one or more locations that correspond to the position of the cavern;

obtaining proposed property values of properties of the cavern that impact seismic measurements;

obtaining a volume model of the subsurface volume of interest in which the subsurface volume of interest has the obtained parameter values around the cavity, and in which the cavern has the proposed property values;

performing synthetic seismic analysis on the volume model to obtain synthetic seismic information; and analyzing the proposed property values by comparing a relationship of a model cavern amplitude of the cavern in the synthetic seismic information to a model background amplitude of the subsurface volume of interest with the relationship of the cavern amplitude to the background amplitude.

2. The method of claim 1, wherein the analyzing operation includes accepting the proposed property values as the values for the parameters of the cavern responsive to the relationship between the model cavern amplitude to the model background amplitude being sufficiently similar to the relationship between the cavern amplitude to the background amplitude.

3. The method of claim 2, further comprising, responsive to the relationship between the model cavern amplitude to the model background amplitude not being sufficiently similar to the relationship between the cavern amplitude to the background amplitude, obtaining new proposed property values for one or more of the parameters and iterating the obtaining a volume model, the performing, and the analyzing operations for the new proposed property values.

4. The method of claim 1, wherein the synthetic seismic analysis is performed to mimic capture of the seismic data from which the obtained seismic information was derived.

5. The method of claim 1, further including:
obtaining cavern information related to sizes of caverns in the subsurface volume of interest generally; and
inferring a size of the cavern from the cavern information.

6. The method of claim 1, wherein the parameters for which proposed property values are obtained include strength parameters.

7. The method of claim 6, wherein the strength parameters include one or more of density, bulk modulus, or rigidity.

8. A system configured to deduce properties of subsurface caverns through seismic information, the system comprising:

one or more processors configured to execute computer program modules, the computer program modules comprising:

a data module configured (i) to obtain seismic information derived from seismic data captured at or near a subsurface volume of interest that includes a cavern, wherein the cavern is represented in the seismic information as a point diffractor, and (ii) to obtain parameter values of parameters of the subsurface volume of interest at one or more locations that correspond to the position of the cavern;

a relationship module configured to determine from the seismic information a relationship of a cavern amplitude of the cavern in the seismic information to a background amplitude of the subsurface volume of interest at one or more locations that correspond to the position of the cavern;

a proposed value module configured to obtain proposed property values of properties of the cavern that impact seismic measurements;

a model module configured to obtain a volume model of the subsurface volume of interest in which the subsurface volume of interest has the obtained parameter values around the cavity, and in which the cavern has the proposed property values;

a synthetic seismic module configured to perform synthetic seismic analysis on the volume model to obtain synthetic seismic information; and an analysis module configured to analyze the proposed property values by comparing a relationship of a model cavern amplitude of the cavern in the synthetic seismic information to a model background amplitude of the subsurface volume of interest with the relationship of the cavern amplitude to the background amplitude.

9. The system of claim 8, wherein the analysis module is further configured to accept the proposed property values as the values for the parameters of the cavern responsive to the relationship between the model cavern amplitude to the model background amplitude being sufficiently similar to the relationship between the cavern amplitude to the background amplitude.

10. The system of claim 9, wherein the analysis module is further configured such that, responsive to the relationship between the model cavern amplitude to the model background amplitude not being sufficiently similar to the relationship between the cavern amplitude to the background amplitude, the proposed value module is prompted to obtain new proposed property values for one or more of the parameters, and the model module, the synthetic seismic module, and the analysis module are further configured to process the new proposed property values.

11. The system of claim 8, wherein the synthetic seismic module is configured such that the synthetic seismic analysis is performed to mimic capture of the seismic data from which the obtained seismic information was derived.

12. The system of claim 8, wherein the data module is further configured to obtain cavern information related to sizes of caverns in the subsurface volume of interest generally, and wherein the computer program modules further comprise a cavern size module configured to infer a size of the cavern from the cavern information.

13. The system of claim 8, wherein proposed value module is configured such that the parameters for which proposed property values are obtained include strength parameters.

14. The system of claim 13, wherein the strength parameters include one or more of density, bulk modulus, or rigidity.

15. Non-transient electronic storage media that stores computer executable instructions configured to cause one or more processors to perform a method of deducing properties of subsurface caverns through seismic information, the method comprising:

obtaining seismic information derived from seismic data captured at or near a subsurface volume of interest that includes a cavern, wherein the cavern is represented in the seismic information as a point diffractor;

determining from the seismic information a relationship of a cavern amplitude of the cavern in the seismic information to a background amplitude of the subsurface volume of interest at one or more locations that correspond to the position of the cavern;

obtaining parameter values of parameters of the subsurface volume of interest at one or more locations that correspond to the position of the cavern;

obtaining proposed property values of properties of the cavern that impact seismic measurements;

obtaining a volume model of the subsurface volume of interest in which the subsurface volume of interest has the obtained parameter values around the cavity, and in which the cavern has the proposed property values;

performing synthetic seismic analysis on the volume model to obtain synthetic seismic information; and analyzing the proposed property values by comparing a relationship of a model cavern amplitude of the cavern in the synthetic seismic information to a model background amplitude of the subsurface volume of interest with the relationship of the cavern amplitude to the background amplitude.

16. The electronic storage media of claim 15, wherein the analyzing operation includes accepting the proposed property values as the values for the parameters of the cavern responsive to the relationship between the model cavern amplitude to the model background amplitude being sufficiently similar to the relationship between the cavern amplitude to the background amplitude.

17. The electronic storage media of claim 16, wherein the method further comprises, responsive to the relationship between the model cavern amplitude to the model background amplitude not being sufficiently similar to the relationship between the cavern amplitude to the background amplitude, obtaining new proposed property values for one or more of the parameters and iterating the obtaining a volume model, the performing, and the analyzing operations for the new proposed property values.

18. The electronic storage media of claim 15, wherein the synthetic seismic analysis is performed to mimic capture of the seismic data from which the obtained seismic information was derived.

19. The electronic storage media of claim 15, wherein the method further comprises:
obtaining cavern information related to sizes of caverns in the subsurface volume of interest generally; and
inferring a size of the cavern from the cavern information.

20. The electronic storage media of claim 15, wherein the parameters for which proposed property values are obtained include strength parameters.

21. The electronic storage media of claim 20, wherein the strength parameters include one or more of density, bulk modulus, or rigidity.

* * * * *